April 5, 1938.     R. E. BREWER     2,112,880
SPEED WARNING SIGNAL
Filed Sept. 4, 1935
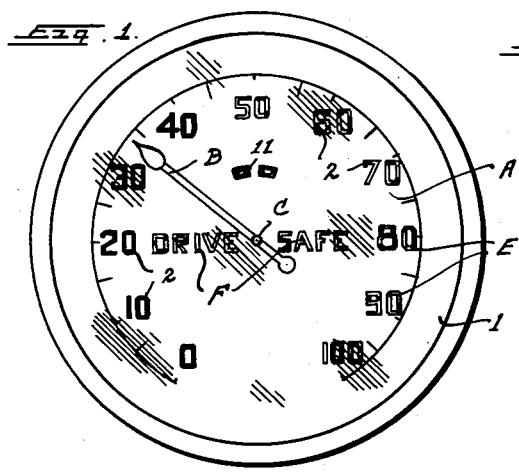
Fig. 1.
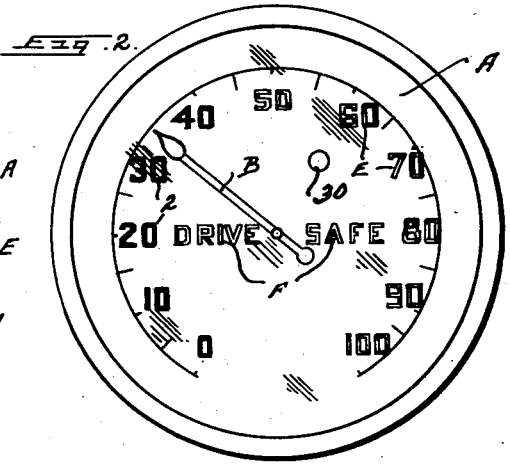
Fig. 2.
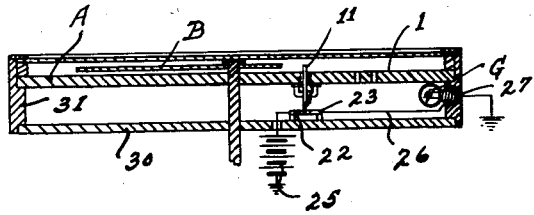
Fig. 3.
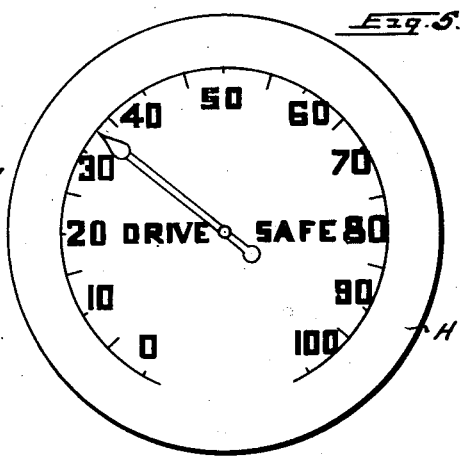
Fig. 5.
Fig. 4.
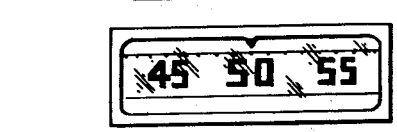
Fig. 6.
Inventor
Ray E. Brewer
By R. M. Thomas
Attorney Patented Apr. 5, 1938

2,112,880

UNITED STATES PATENT OFFICE 2,112,880

SPEED WARNING SIGNAL

Ray E. Brewer, Salt Lake City, Utah

Application September 4, 1935, Serial No. 39,101

2 Claims. (Cl. 177—311.5)

My invention relates to speed warning signals for vehicles and more particularly for fast moving automobiles, trucks and busses, and has for its object to provide a luminous section on the speedometer dial which will show more plainly than the usual numerals indicating the speed of travel.

A still further object is to provide a luminous dial for speedometers which will be automatically operated to indicate that the driver is driving in excess of safe speed when the speed of the automobile exceeds a predetermined speed, that shown being fifty miles per hour.

A still further object is to provide a safety feature in connection with the speedometer to always illuminate the dial or numbers indicating speed when the automobile has exceeded a certain predetermined speed and which illumination will either show red letters indicating that the driver should "Drive Safe", "Drive Safely", or will illuminate the numerals of the speedometer showing where the speedometer needle has moved into a range indicating that the vehicle is moving at a speed greater than the safe speed for driving.

A still further object is to provide a warning signal for drivers which will by visible means show them when they are in the danger zone of fast driving, and that they should either slow down or be more careful in their driving.

These objects I accomplish with the device illustrated in the accompanying drawing in which similar numerals and letters of reference indicate like parts throughout the several views and as described in the specification forming a part of this application and pointed out in the appended claims.

In the drawing in which I have shown my device

Figure 1 is a plan view of a speedometer showing my method of lighting the dial.

Figure 2 is a plan view of another form of lighting the warning words and numerals of the speedometer dial.

Figure 3 is a section on line 3—3 of Figure 1.

Figure 4 is an enlarged section of the dial showing the throw switch used to turn the light on and off which lights the numerals and words of the dial.

Figure 5 is a view of the dial removed from the speedometer with the numerals from "50" to "100", shown as red colored.

Figure 6 is a modified form of speedometer dial showing my application of different colored numerals in the older type of annular speedometer dial.

In the drawing I have shown the device with the speedometer dial as A, the needle or pointer as B, and the center shaft C extends from the pointer back to the operating mechanism (not shown). The face 1 of the dial A is provided with graduated numbers 2, preferably from "0" to "100". The first set of numerals "0" to "40" are shown in the usual manner in black and the numerals E from "50" to "100" in Figures 1 and 2, will be perforated or stenciled or open face letters with the openings through the face thereof so that light will pass therethrough to illuminate them when the speed of the automobile has reached "50" miles or greater. To accomplish this I provide a throw switch 11 mounted onto the back side of the dial and this switch consists of a bifurcated or U-shaped body 12 having the legs 13 and 14 extending out through the face of the dial A through openings 15 and 16. The bracket for supporting the switch is shown as 17 and a throw spring 18 extends from bracket to the switch knife plate 19, said spring to throw the switch quickly, once the pointer has engaged either leg and moved it to a position slightly beyond dead center of the mounting of the spring 18. The switch knife plate 19 of the switch body 12 is extended from the base 20 of the U-shaped body 12 and is equidistant from each leg and extends back therefrom sufficient distance to engage between two spring contact members 22 and 23. These spring contacts 22 and 23 are connected into a light circuit and when the knife switch 19 engages the two contacts 22 and 23 the circuit passes from a source of electrical energy such as the battery 25 through these contacts 22 and 23 and the knife switch 19 to a wire 26 which wire carries the current to the base of a light globe G through the base to the filament of the globe and then back to a grounded plate 27 to complete the circuit and illuminate the globe. This globe will preferably be of a red color to show more clearly that there is danger when driving at the fast speeds.

Through the face or dial A, I also provide a set of words F, such as those shown of "Drive Safe" and these words will also be open faced or perforated so that the light from the globe will pass therethrough at the same time it is illuminating the numerals. A glass or cover of the usual type will be provided over the face of the speedometer and the contacts 22 and 23 and rear of the device will be mounted on a back plate 30 which plate is spaced from the dial by an annular ring 31 which will completely enclose the light from the globe so that it cannot be seen at any other place than through the perforated face of the dial.

As shown in Figure 2 there will be a perforation or opening 30 through the dial to allow light to pass therethrough and add to the warning to the driver. This type of dial may have the numerals perforated or may not and the words of warning may or may not be perforated, as desired.

In Figure 5 the dial is shown as H with the first numerals "0" to "40" shown printed black and the numerals "50" to "100" shown printed in red color only. This will be a cheap type of the device used only as a visual warning to the driver but not having the benefit of the light to throw on the red color when the danger point of driving is reached. It will be obvious that the perforated portions of the dial may be covered with a transparent red material if desired, to show more distinctly the red of danger. Other modifications may be made in the mechanical details of construction of the device without departing from the spirit of the invention or the scope of the claims.

The operation of my device is as follows:

When the driver has reached the "50" mile mark, the hand B will engage the farther leg 14 of the throw switch and as it passes beyond this mark the pressure of the finger or hand will force this leg down till the position of the U-shaped body has passed beyond dead center of the spring at which time the spring 18 will throw the switch and the knife 19 will engage the two contacts 22 and 23 completing the electrical circuit and illuminating the globe G. As the speed increases or stays beyond fifty miles per hour this globe continues to burn but as soon as the hand drops back to fifty miles per hour and the speed is still more decreased, the hand engages the leg 12 and throws the switch disconnecting the knife from the contacts and breaking the circuit.

Other types of switches may be used to make and break the electrical circuit if desired.

Having thus described my invention I desire to secure by Letters Patent and claim:

1. In a speedometer dial and attachment therefor, the combination of a generally opaque dial on which the low speed indications are printed and the higher speed indications transparent; a dial plate mounted spaced from said dial; a light globe mounted in the space back of said dial near the transparent indicia; a speedometer hand journaled in said dial and rotatable in front thereof but, in near proximity thereto; perforations through said dial in approximate alignment with the lowest of said higher indications; a switch mounted to the plate back of said dial with the throw ends extended through the perforations in said dial into the path of travel of said speedometer hand; a wire leading from a source of electrical energy to one pole of said switch; another wire leading from the opposite pole of said switch to said light globe to illuminate the globe when the speedometer hand has been moved upwardly on said scale to a point close to the said lowest of said higher indications and actuated said switch and to turn off said switch when the speedometer hand has again dropped below said point.

2. In a speedometer, the combination of a generaly opaque dial having the lower speed indicating numerals printed thereon on the face thereof and the larger speed indicating numerals perforated, illuminating means behind said dial to illuminate, when operative, the perforated numerals, and means to render said illuminating means operative only when the speedometer indicates a speed substantially equal to and above that of the lowest perforated numeral and to continue said illumination until the speed drops below that indicated by the perforated numerals.

RAY E. BREWER.